(12) United States Patent
Künz (10) Patent No.: US 9,517,601 B2
(45) Date of Patent: Dec. 13, 2016

(54) METHOD FOR CALIBRATION OF A POUR OPENING OF A PLASTIC CONTAINER PRODUCED IN AN EXTRUSION-BLOW-MOLDING METHOD

(71) Applicant: ALPLA WERKE ALWIN LEHNER GMBH & CO. KG, Hard (AT)

(72) Inventor: Johann Künz, Hard (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 35 days.

(21) Appl. No.: 14/082,759

(22) Filed: Nov. 18, 2013

(65) Prior Publication Data

US 2014/0069943 A1    Mar. 13, 2014

Related U.S. Application Data

(63) Continuation of application No. PCT/EP2012/001545, filed on Apr. 10, 2012.

(30) Foreign Application Priority Data

May 16, 2011    (CH) .......................................... 825/11

(51) Int. Cl.
*B29D 22/00*    (2006.01)
*B29C 49/76*    (2006.01)
(Continued)

(52) U.S. Cl.
CPC ............. *B29D 22/003* (2013.01); *B29C 49/76* (2013.01); *B65D 1/04* (2013.01); *B65D 81/3283* (2013.01); *B29C 49/04* (2013.01); *B29C 49/22* (2013.01)

(58) Field of Classification Search
None
See application file for complete search history.

(56) References Cited

U.S. PATENT DOCUMENTS 2,861,295 A    11/1958  Hagen et al.
3,271,489 A *   9/1966  Fogelberg et al. ........... 264/529
(Continued)

FOREIGN PATENT DOCUMENTS

GB             688997 A        3/1953
WO    WO 03/029103 A1        4/2003

OTHER PUBLICATIONS

International Search Report (PCT/ISA/210) mailed on Jun. 29, 2012, by the European Patent Office as the International Searching Authority for International Application No. PCT/EP2012/001545.
(Continued)

*Primary Examiner* — Monica Huson
(74) *Attorney, Agent, or Firm* — Buchanan Ingersoll & Rooney PC (57) ABSTRACT

A method is disclosed for providing dimensional accuracy of a pour opening in or on a plastic container produced by extrusion-blow-molding. The method can include inserting a section of a plastic hose, extruded in one or more layers through an extrusion nozzle, into a mold cavity of a blow mold tool; and inflating the plastic hose by a calibrating blow pin according to a shape of the mold cavity, whereby at least one pour opening of the plastic container is determined with respect to its inside diameter and its inside contour to form a completed inflated plastic container, and wherein the calibrating blow pin is axially inserted into the plastic hose section after a head plate of the blow mold tool has been closed.

16 Claims, 5 Drawing Sheets

(51) Int. Cl.
*B65D 81/32* (2006.01)
*B65D 1/04* (2006.01)
*B29C 49/04* (2006.01)
*B29C 49/22* (2006.01)

(56) References Cited

U.S. PATENT DOCUMENTS

| | | |
|---|---|---|
| 3,412,187 A | 11/1968 | Fogelberg et al. |
| 4,217,328 A | 8/1980 | Cambio, Jr. |
| 4,954,071 A * | 9/1990 | Austin .................. B29C 49/50 |
| | | 425/289 |
| 6,602,459 B1 | 8/2003 | Johnston et al. |
| 6,976,603 B1 | 12/2005 | Johnston et al. |
| 2005/0121034 A1 | 6/2005 | Kennedy et al. |

OTHER PUBLICATIONS

Written Opinion (PCT/ISA/237) mailed on Jun. 29, 2012, by the European Patent Office as the International Searching Authority for International Application No. PCT/EP2012/001545.
International Preliminary Report on Patentability (Form PCT/IB/373) and the Written Opinion of the International Searching Authority (for PCT/ISA/237) issued on Nov. 19, 2013, by the International Bureau of WIPO in corresponding International Application No. PCT/EP2012/001545. (9 pages).

\* cited by examiner

Fig. 11

METHOD FOR CALIBRATION OF A POUR OPENING OF A PLASTIC CONTAINER PRODUCED IN AN EXTRUSION-BLOW-MOLDING METHOD

RELATED APPLICATION

This application claims priority as a continuation application under 35 U.S.C. §120 to PCT/EP2012/001545, which was filed as an International Application on Apr. 10, 2012 designating the U.S., and which claims priority to Swiss Application 825/11 filed in Switzerland on May 16, 2011. The entire contents of these applications are hereby incorporated by reference in their entireties.

FIELD

The disclosure relates to a method for ensuring the dimensional accuracy, for example for the calibration, of a pour opening in or on a plastic container, produced in an extrusion-blow-molding method. The disclosure also relates to a plastic container calibrated according to the method.

BACKGROUND INFORMATION

Known containers made of tin or multicolored sheet metal, glass or else ceramic, are increasingly being replaced by containers made of plastic. In the meantime, primarily plastic containers can be used for example, for the packaging of fluid substances, for example beverages, household products, care products, cosmetics, etc. The low weight and the lower costs can play a significant role in this substitution. The use of recyclable plastic materials and the overall total energy balance in their production can also contribute to promoting the acceptance of plastic containers, for example plastic bottles, in consumers.

The production of plastic containers, for example plastic bottles, for example made of polyethylene or polypropylene, has been carried out in an extrusion-blow-molding method, for example in a plastic hose blow method. In this method, a plastic hose is extruded with an extrusion head, introduced into the mold cavity of a blow mold tool, inflated by overpressure, cooled and demolded. The inflation of a plastic hose section introduced into the blow mold cavity can be carried out with a calibrating blow pin, which is inserted through an opening of the blow mold cavity. On the one hand, the calibrating blow pin provides a function of introducing air into the plastic hose, so that the latter is formed according to the blow mold cavity. On the other hand, the calibrating blow pin is also used for defined inside forming (calibration) of the neck of the plastic container, in which the pour opening is provided. This shaping function of the calibrating pin includes (e.g., consists of) a defined determination of the inside diameter of the neck. To this end, the calibrating blow pin is inserted through the opening of the closed blow mold tool into the hose section. Thereby, excess plastic material is axially displaced, and the inside diameter of the neck is determined with the pour opening.

In the case of pour openings with inside diameters of, for example, approximately 10 mm to approximately 85 mm, this type of calibration has proven to be very practicable, and the desired dimensional accuracy can be achieved without great difficulty.

In the case of smaller inside diameters of for example less than 7 mm, however, a danger can exist that the calibrating blow pin pushes the softened plastic material through the opening of the blow mold tool during axial advance, and it thus results in a defective design of the neck. This can occur when, for example, there is no plastic material available from the adjacent areas above during the axial movement of the calibrating blow pin for the calibration.

In the case of plastic containers, which in addition to the larger pour opening have a smaller pour opening, which is provided, for example, within the plastic container, the calibration can prove to be even more difficult. The smaller pour opening is connected, for example, to another chamber of the plastic container.

In another variant, the smaller pour opening can be an outlet of a metering tube arranged within the plastic container, which tube is to be connected to a metering chamber that is, for example, integrated in a pour attachment, which is attached to the neck of the completed blow-molded plastic container. For the inflation of such plastic containers, double calibrating blow pins can be used, which can be designed in such a way that the pour opening on the neck of the plastic container and that in the second chamber or in the metering tube can be formed at essentially the same time.

While the calibration of the pour opening on the neck can be achieved without great difficulty because of its relatively large inside diameter, the direct calibration of the smaller opening with the double calibrating blow pin can prove to be very difficult. For this reason, the calibration of the smaller opening is carried out within the inflated container by for example, machining such as with spindles, which follows the blow-molding process to achieve the desired dimensional accuracy of, for example, up to ±0.03 mm. The machining can however have a drawback that chips fall into the interior of the container and should be removed again from there.

In the case of a metering tube with a relatively small inside diameter, a danger exists that the chips cannot be completely removed. The latter can then prevent a flow through the metering tube and can result in the plastic container that is produced having to be rejected. Moreover, the machining and the subsequent removal of chips represent involve additional operating steps, which increase the expense for the production of the plastic container.

SUMMARY

A method is disclosed for providing dimensional accuracy of a pour opening in or on a plastic container produced by extrusion-blow-molding, comprising: inserting a section of a plastic hose, extruded in one or more layers through an extrusion nozzle, into a mold cavity of a blow mold tool; and inflating the plastic hose by a calibrating blow pin according to a shape of the mold cavity, whereby at least one pour opening of the plastic container is determined with respect to its inside diameter and its inside contour to form a completed inflated plastic container, and wherein the calibrating blow pin is axially inserted into the plastic hose section after a head plate of the blow mold tool has been closed.

BRIEF DESCRIPTION OF THE DRAWINGS

Further advantages and features encompassed by the disclosure follow from the subsequent description of exemplary methods with reference to the diagrammatic drawings. In depictions, that are not true to scale.

In the description of the figures below, the same reference numbers identify the same components in each case.

DETAILED DESCRIPTION

An extrusion-blow-molding method is disclosed for plastic containers whereby even pour openings with smaller diameters can be calibrated without additional operating steps following the blow-molding process in order to maintain a desired dimensional accuracy. For example, the method can perform a calibration of the pour opening at essentially the same time with an inserted double calibrating blow pin even in the case of plastic containers with an additional pour opening, optionally arranged inside the container, of an additional chamber or a metering tube.

In exemplary embodiments, a method is disclosed for ensuring the dimensional accuracy, for example for the calibration, of a pour opening in or on a plastic container that is produced in an extrusion-blow-molding method.

An exemplary disclosed method can ensure the dimensional accuracy, for example for the calibration, of a pour opening in or on a plastic container produced in an extrusion-blow-molding method. In an exemplary method, a section of a plastic hose extruded in one or more layers through an extrusion nozzle is inserted into a mold cavity of a blow mold tool and inflated by a calibrating blow pin according to the surrounding mold cavity. In this case, at least one pour opening of the plastic container is determined, for example calibrated, with respect to its inside diameter and its inside contour. Then, the completed inflated plastic container is demolded. The calibrating blow pin is inserted axially into the plastic hose section, after a head plate of the blow mold tool was closed, but before the blow mold tool has reached its completely closed position.

An exemplary calibrating method according to the disclosure can be distinguished from known methods of the state of the art in that the calibration of the opening is carried out by a radial squeezing. For example, only the head plate of the blow mold tool is completely closed, so that the plastic hose section is held securely. The blow mold tool is not completely closed.

When the calibrating blow pin is inserted, the plastic hose can be widened in the radial direction. An axial pushing-aside of the plastic hose is thus avoided. When the blow mold tool is completely closed, the plastic hose is squeezed radially in the area of the calibrating surfaces of the calibrating blow pin. In this case, excess plastic material is displaced in axial direction.

The calibration of the pour opening(s) is carried out as in the known method of the state of the art during the inflation process. Separate operating steps, such as, for example, machining with subsequent removal of chips, which can be performed only following the extrusion-blow-molding process, can be unnecessary. The radial calibration according to the disclosure can be performed in known extrusion-blow-molding machines. The altered calibration method should be taken into consideration accordingly in the control of the feed of the calibrating blow pin and the closing mechanism for the blow mold tool.

The blow mold tool can include two blow mold halves, which can be advanced toward one another and separated again approximately perpendicular to the feed direction of the calibrating blow pin. The calibrating blow pin is inserted axially into the plastic hose section, while the blow mold halves are still at a distance from one another that is, for example, approximately 0.5 mm to 10 mm larger than the inside diameter of a pour opening on the neck of the plastic container. By this distance, it is ensured that the calibrating blow pin can be inserted unhindered into the plastic hose section, whereby the latter can also be widened in radial direction.

In contrast, the distance of the blow mold halves from one another is for example not so large, such that the closing process can take place in a short enough time. The closing of the blow mold halves is done, however, when the calibrating blow pin has been advanced into a desired position axially. The inside diameter of the pour opening on the neck of the plastic container in this case corresponds to the outside diameter of the calibrating pin in this calibrating section.

An exemplary variant embodiment of a method according to the disclosure calls for the calibrating blow pin to be inserted with a still open blow mold tool into an axial position, which is axially spaced for example approximately 0.3 mm to approximately 5 mm from its end position. In this case, the blow mold tool is still open.

Only after the calibrating blow pin has reached the desired axial position is the blow mold tool completely closed. After the blow mold tool is completely closed, the calibrating blow pin is advanced into its axial end position. As a result, it can be ensured that the separation of the plastic hose section is performed only when the blow mold tool is completely closed.

The calibrating blow pin can be advanced intermittently during the calibrating method, e.g., it is advanced into the inflating plastic hose section up to its intended axial position, rests during the complete closing of the blow mold tool, and is advanced into its axial end position after the blow mold tool is closed. An exemplary alternative method variant calls for the calibrating blow pin to be advanced continuously until it has reached its axial end position, e.g., for it also to be continually axially advanced during the closing process of the blow mold tool. This alternative method variant can be simpler to implement in terms of production control.

In exemplary embodiments, a calibrating blow pin is only either continuously advanced into its axial end position or is retracted again into its starting position after the blow mold tool is opened.

The axial feed rate of the calibrating blow pin is for example approximately (e.g., plus/minus 10 percent) 5 mm/s to approximately 80 mm/s. This feed rate applies both for the intermittent feed and for the continuous feed of the calibrating blow pin.

A suitable exemplary variant embodiment of the method according to the disclosure calls for the use of a double calibrating blow pin, which has two calibration areas for two pour openings of special plastic containers. Such special plastic containers have, for example, two chambers. Another type of plastic container can have a metering tube arranged inside the container, which metering tube leads to the bottom area of the container. The use of a double calibrating blow pin with two calibration areas allows the simultaneous calibration of two pour openings.

Process control can be carried out analogously to the above-described process control with a calibrating blow pin with only one calibration area.

In the performance of an exemplary method according to the disclosure with a double calibrating blow pin, the calibration areas of the double calibrating blow pin can be axially advanced coupled to one another. This can be carried out simply in that the two calibration areas of the double calibrating blow pin can be provided on two partial calibrating blow pins, which can be connected tightly to one another. In this case, the partial calibrating blow pins can also connected to a common feed for the blow-molding medium, such as air, and a common drain line for the hot blow-molding medium that exits from the inflated plastic hose section.

By the use of a double calibrating blow pin, whose calibration areas can be arranged at different axial heights, pour openings can also be calibrated that can be arranged further down axially, e.g., within the inflating plastic container arranged closer to the bottom.

If a double calibrating blow pin is used, whose calibration areas can be designed with outside diameters that can be different from one another, a pour opening that has a larger inside diameter on the neck of the plastic container and a second pour opening that is smaller in diameter and is arranged further down axially in the interior of the plastic container, can be calibrated practically at the same time.

Plastic containers, produced in the extrusion-blow-molding method, whose pour openings have been calibrated according to one or more of the above processes, can be distinguished by a very high dimensional accuracy with very low tolerances of up to, for example, ±0.03 mm.

Exemplary calibrating methods according to the disclosure have proven especially suitable for the production of plastic containers, which have at least two pour openings, which must have a high dimensional accuracy. The use of calibrating methods according to the disclosure makes possible a very economical calibration even of such plastic bottles.

In this case, the pour openings can have the same or different size inside diameters. Depending on the inside diameter of the larger pour opening, the second opening that is to be calibrated can also have an inside diameter that is larger than, for example, 7 mm.

Calibrating methods according to the disclosure have proven advantageous for example for the production of plastic containers that have at least one additional pour opening with a smaller inside diameter, which is arranged inside the plastic container. For example, the additional pour opening is the outlet of a metering tube, which leads to the bottom area of the plastic container. The additional pour opening is designed for the coupling to a metering chamber of a pour attachment. In this case, absolute leak tightness is to be ensured. This is achieved in the case of openings, calibrated according to an exemplary method of the disclosure, within the desired low tolerances of up to, for example, ±0.03 mm.

Figure 1:
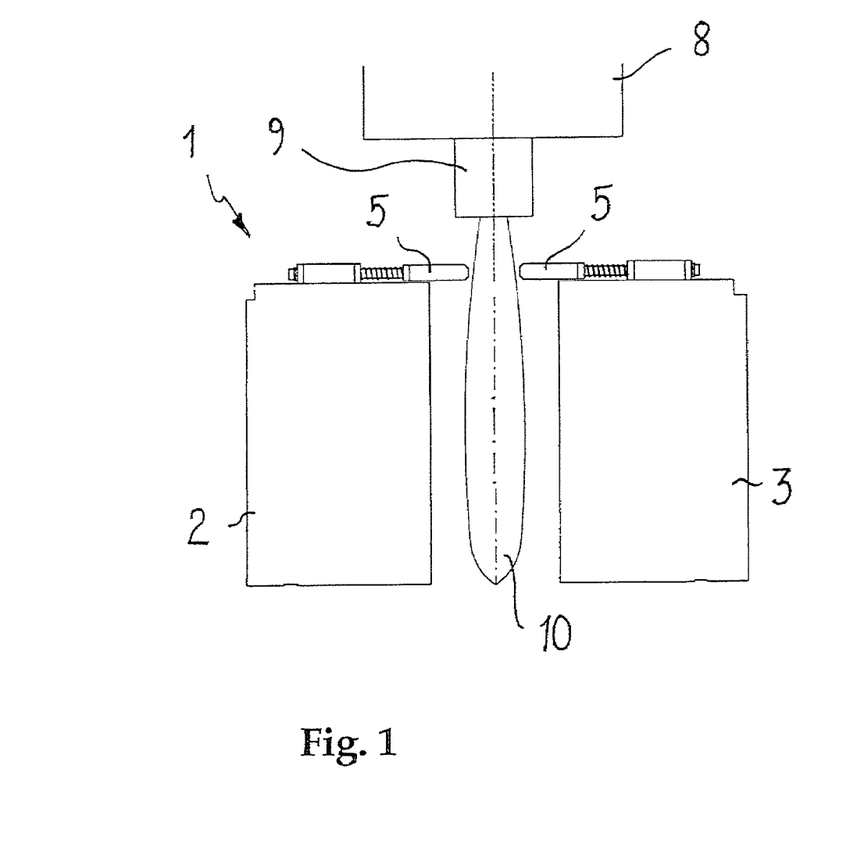
FIG. 1 shows an exemplary extrusion head with an extruded plastic hose and an exemplary blow mold tool with two blow mold halves in the open position.

FIG. 1 shows a blow mold tool of an exemplary extrusion-blow-molding machine, referenced overall with the reference number 1, with two blow mold halves 2, 3 that can be depicted in the open state and that delimit a mold cavity in the closed state. A head plate 5, whose head plate elements can be spring-loaded, is indicated on the top of the blow mold tool. In exemplary embodiments of the blow mold tool, the adjustment of the head plate elements can also be carried out hydraulically, pneumatically or electrically. Above the blow mold tool 1, an extrusion head 8 is indicated, from whose extrusion nozzle 9 a single-layer or multi-layer plastic hose 10 is extruded.

Figure 2:
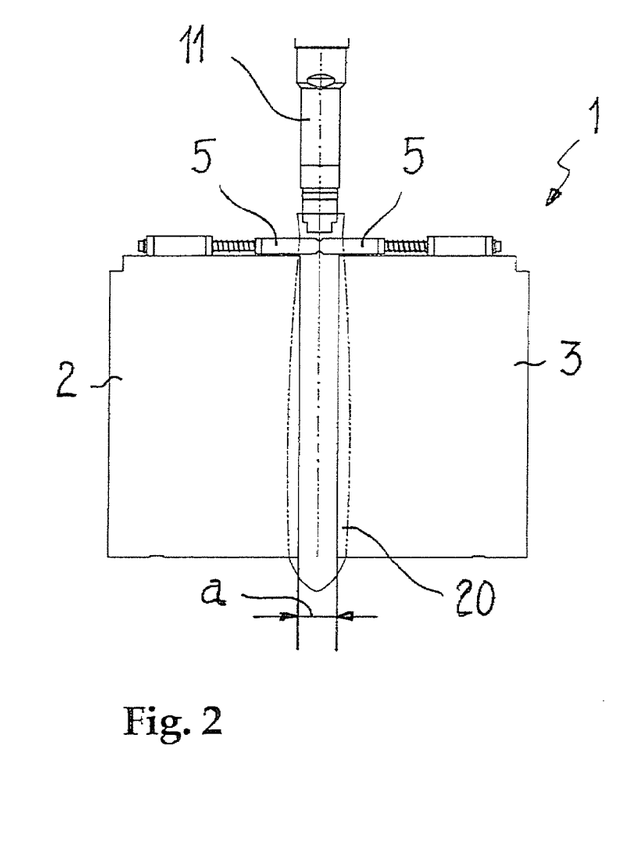
FIG. 2 shows an exemplary blow mold tool with a closed head plate and a plastic hose section that is held by the latter and exemplary blow mold halves that can be advanced towards one another, but which are not yet completely closed, and an exemplary calibrating blow pin that is indicated above the blow mold tool.

FIG. 2 shows the blow mold tool 1 of FIG. 1 already in the blow-molding station of the extrusion-blow-molding machine. A plastic hose section 20 is separated and is located between the two blow mold halves 2, 3. The spring-loaded head plate elements of the head plate 5 can be already closed and hold the inserted plastic hose section 20, which is indicated in broken lines in the invisible areas.

The two blow mold halves 2, 3 are not yet completely closed, but rather they still can be at a distance a from one another, which is for example approximately 0.5 mm to approximately 10 mm larger than the inside diameter of the neck of the plastic container that is to be inflated. Above the blow mold tool 1, a calibrating blow pin 11 is indicated, which is inserted axially through an opening (not shown) into the head plate 5 in the plastic hose section 20. The calibrating blow pin can be used to inflate the plastic hose section in a container according to the mold cavity and to calibrate the pour opening of the plastic container.

Figure 3:
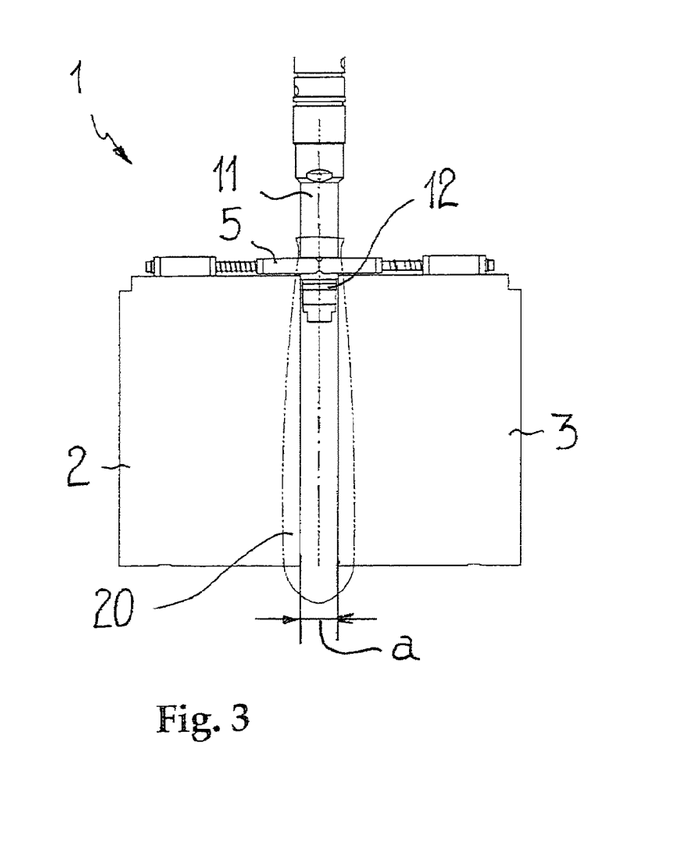
FIG. 3 shows an exemplary blow mold tool with blow mold halves in the position according to FIG. 2 and an exemplary calibrating blow pin that is advanced into the plastic hose section axially with the blow mold tool still open.

FIG. 3 shows the calibrating blow pin 11 that is advanced into the plastic hose section 20 with the blow mold halves 2, 3 still open. The blow mold halves 2, 3 can be at a distance "a" from one another. The calibrating blow pin 11 has a calibration area 12, which is located below the closed head plate 5 in the depicted position already in the subsequent neck area of the plastic container that is to be inflated from the plastic hose section 20.

Figure 4:
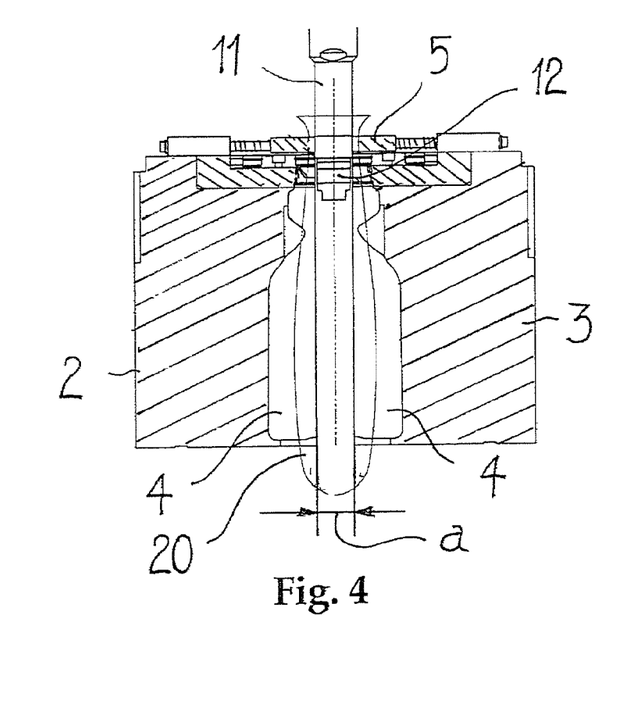
FIG. 4 shows an axially sectioned view of an exemplary blow mold tool in the position according to FIG. 3.

FIG. 4 shows a partial axial section of the depiction in FIG. 3. The blow mold halves 2, 3 of the blow mold tool 1 that can be located at a distance a from one another each include a part of the mold cavity 4. The plastic hose section that is located between the blow mold halves is indicated at 20.

The calibrating blow pin that is advanced through an opening into the closed head plate 5 in the plastic hose section 20 in turn bears the reference number 11. Its calibration area is indicated at 12 and is located below the closed head plate 5.

Figure 5:
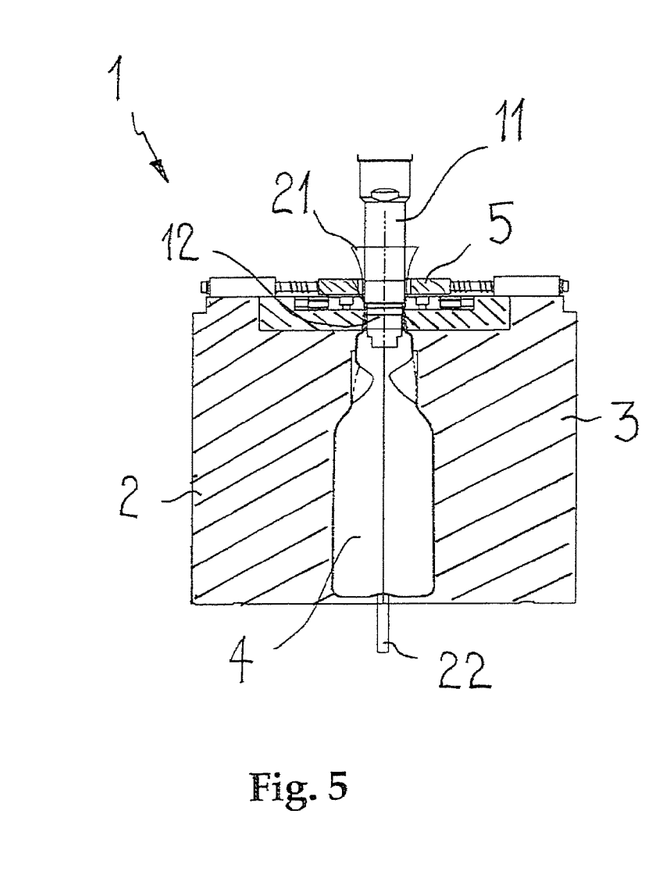
FIG. 5 shows an axially sectioned view of an exemplary blow mold tool according to FIG. 4 with completely closed blow mold halves.

FIG. 5 shows the closed blow mold tool 1; the blow mold halves 2, 3 can be brought together until they touch and delimit the mold cavity 4, which determines the shape of the plastic container that is to be inflated.

The section of the plastic hose section that projects from the mold cavity above the head plate 5 is referenced as upper slug 21; the section of the plastic hose section that projects on the lower end of the blow mold tool 1 is referenced as lower slug 22. The plastic hose section is essentially already inflated to form a plastic container according to the mold cavity 4.

By the closing of the blow mold halves 2, 3, the plastic material is squeezed radially in the neck area between the blow mold halves 2, 3 and the calibration area 12 of the advanced calibrating blow pin 11. As a result, the neck area is calibrated with the pour opening with respect to its inside diameter and its inside contour according to the calibration area 12 of the calibrating blow pin.

The outside contour of the neck area is formed in this area according to the configuration of the mold cavity 4. Excess plastic material is axially displaced. The calibrating blow pin 11 is still not advanced into its axial end position, however, but rather is located in a position that is at an axial distance d of for example approximately 0.3 mm to approximately 5 mm from the end position.

Figure 6:
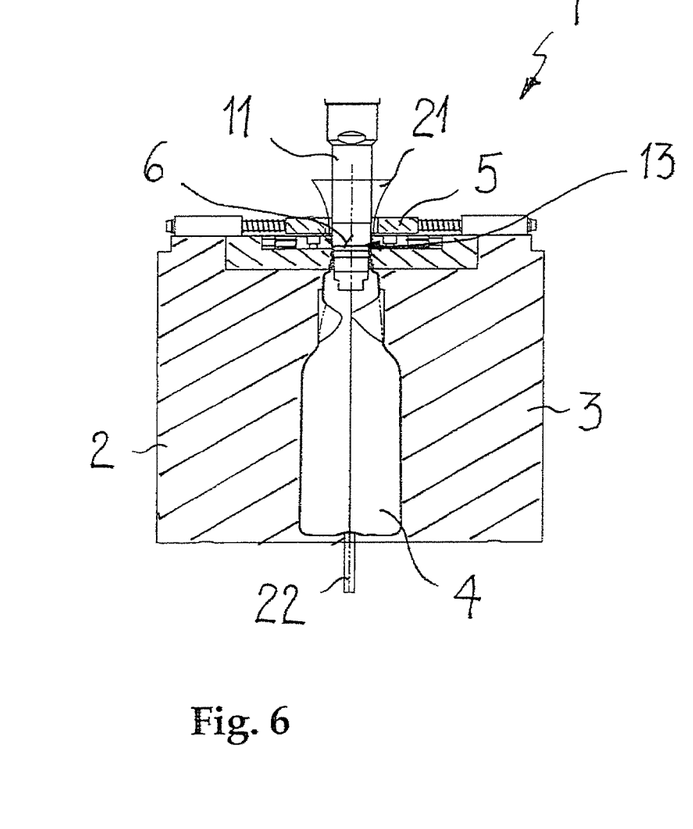
FIG. 6 shows an axially sectioned view of an exemplary closed blow mold tool with an exemplary calibrating blow pin that has been advanced axially into its end position.

The sectional view in FIG. 6 corresponds to a large extent to that of FIG. 5. Now, the calibrating blow pin 11 has been advanced into its end position, in which a cutting ring 13 provided on the calibrating blow pin 11 is pressed against an encircling annular stop 6 in the blow mold tool 1. Thereby, the upper slug 21 is already cut away.

Figure 7:
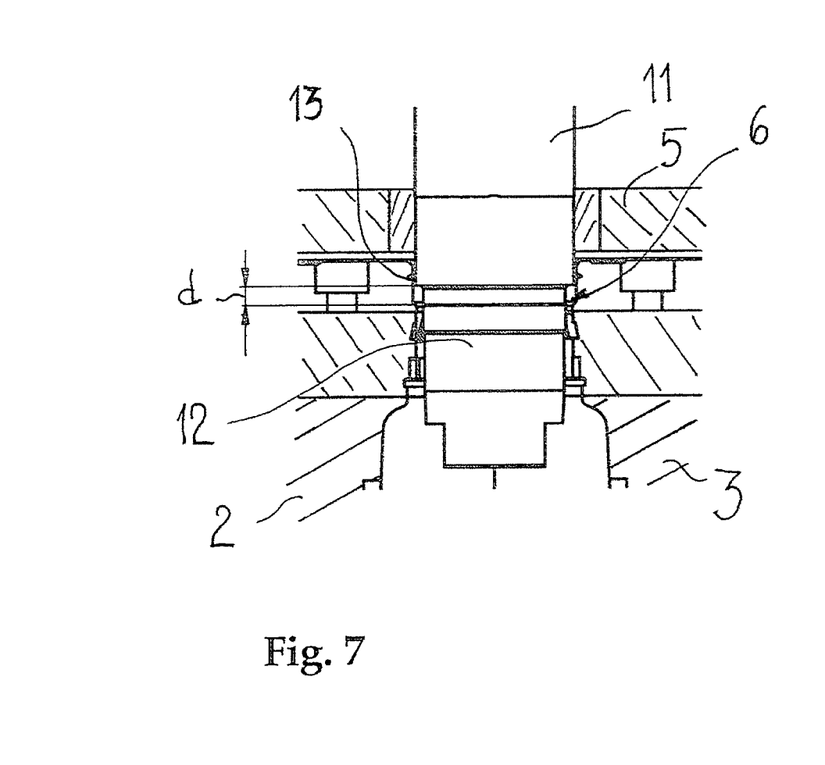
FIG. 7 shows an enlarged sectional view for explaining a position of the calibrating blow pin in FIG. 5.
Figure 8:
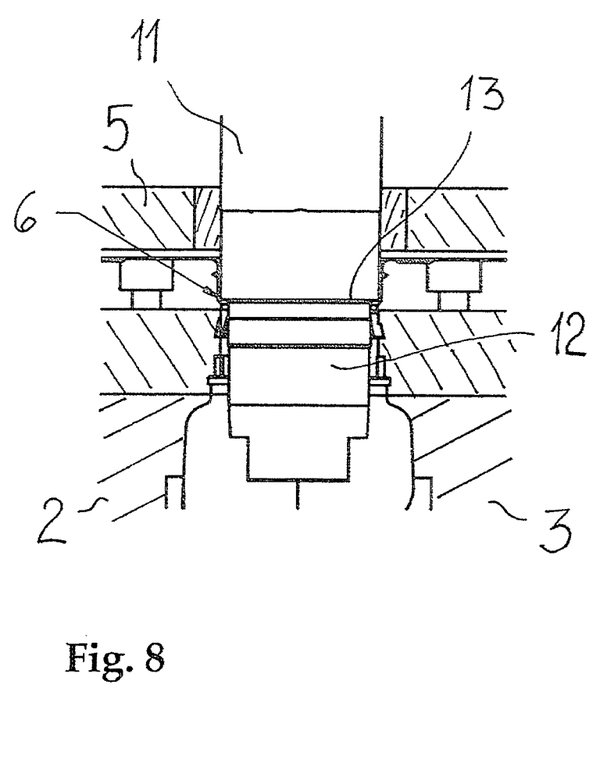
FIG. 8 shows an enlarged sectional view for explaining an end position of the exemplary calibrating blow pin in FIG. 6.

On an enlarged scale, FIGS. 7 and 8 show an exemplary position of the calibrating blow pin 11 before (FIG. 7), and after it is advanced into its axial end position (FIG. 8). The axial distance "d" between the cutting ring 13 and the circumferential stop 6 in the blow mold tool, depicted in FIG. 7, is for example approximately 0.3 mm to approximately 5 mm.

The calibrating blow pin 11 should be advanced by this amount of travel to reach its end position (FIG. 8), in which the cutting ring 13 abuts the circumferential stop 6. The calibration area on the calibrating blow pin 11 is again referenced with the reference number 12. The closed head plate 5 is indicated at 5. The two blow mold halves can be referenced with 2 and 3.

During an exemplary calibrating method, the calibrating blow pin 11 can be intermittently advanced; e.g., it is advanced to its predefined axial position at a distance "d" from its end position in the plastic hose section that is to be inflated, it rests when the blow mold halves 2, 3 can be closed completely, and it is advanced into its axial end position after the blow mold tool is closed. In an exemplary alternative variant method, the calibrating blow pin 11 can also be advanced continuously until it has reached its axial end position; e.g., it is also advanced continuously axially during the closing process of the blow mold halves. The axial feed rate of the calibrating blow pin 11 is for example approximately 5 mm/s to approximately 80 mm/s. This feed rate applies both for the intermittent feed and for the continuous feed of the calibrating blow pin 11.

Figures 9, 10, 11:
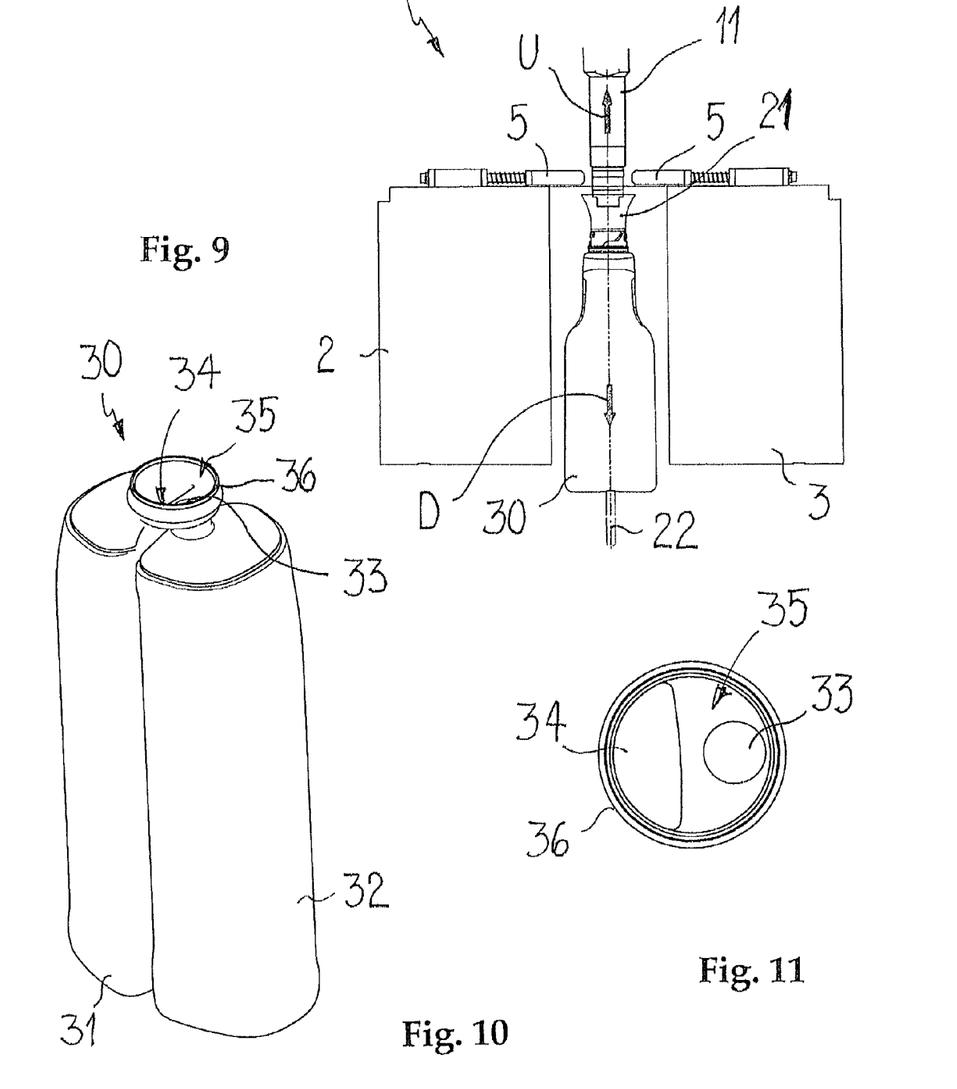
FIG. 9 shows an exemplary blow mold tool with an open head plate and open blow mold halves at a time an exemplary blow-molded plastic container is demolded.
FIG. 10 shows a view of an exemplary two-chamber bottle with two calibrated pour openings.
FIG. 11 shows a view of an exemplary neck of the two-chamber bottle in FIG. 10.

FIG. 9 shows a view of the open blow mold tool 1 with blow mold halves 2, 3 that can be retracted from one another radially. The spring-loaded head plate elements of the head plate 5 are also open.

The arrow U indicates that the calibrating blow pin 11 is retracted from the completed inflated plastic container 30. The arrow D indicates that the plastic container 30 falls out from the open blow mold tool 1. The precut upper and lower slugs, which should still be removed, are indicated at 21 and 22.

FIG. 10 shows an exemplary embodiment of an extrusion-blow-molded plastic container 30, whose pour openings have been calibrated according to an exemplary method of the disclosure. The plastic container 30 is a two-chamber container with a first chamber 31 and a second chamber 32. The first chamber 31 has a pour opening 34. The second chamber 32 is provided with a smaller pour opening 33. A neck 36 of the container 30 has a central larger pour opening 35.

FIG. 11 shows a top plan view of the neck 36 of an exemplary two-chamber container. The central pour opening 35 on the neck 36 of the container and the smaller pour opening 33 of the second chamber of the container have a circular cross-section. The pour opening 34 of the first chamber of the container has a more irregular, essentially semi-circular shape. The central pour opening 35 and the smaller pour opening 33 can be calibrated. This makes it possible, for example, to mount a pour attachment, which is tightly connected to the smaller pour opening via an axially protruding tube.

The calibration of the central pour opening 35 on the neck of the container and the smaller pour opening 33 of the first chamber of the container can be carried out with a double calibrating blow pin. The latter has two partial calibrating blow pins, on which calibration areas can be provided.

The partial calibrating blow pins can be tightly connected to one another and can be advanced together. The partial calibrating blow pin with the smaller calibrating diameter extends beyond the second partial calibrating pin for the larger central pour opening 35. The distance by which the partial calibrating pin with the smaller calibrating diameter protrudes corresponds to the axial distance between the outlets of the two pour openings 35 and 33. By using a double calibrating blow pin, the calibration of the two pour openings is carried out virtually at the same time.

In principle, instead of the known axial calibrating method, a radial calibrating method according to the disclosure can be used in plastic containers with a pour opening on the neck of the inflated plastic container. Even if a special inside contour of the container neck is to be produced, the radial calibrating method according to the disclosure can be preferred relative to the calibrating method of the state of the art.

Exemplary disclosed methods can prove especially suitable for example with the use of a double calibrating blow pin, which has two calibration areas for two pour openings of special plastic containers. Such plastic containers can have, for example, two chambers.

Another exemplary variant embodiment of the plastic container can have a metering tube arranged in the interior of the container, which metering tube empties into the bottom area of the container. By using a double calibrating blow pin and a radial calibrating method according to the disclosure, the pour opening of the tube arranged in an interior of the container and the pour opening of the neck of the container can also be calibrated at essentially the same time, as early as during the blow-molding process of the container. A subsequent machining is unnecessary.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for providing dimensional accuracy of a pour opening in or on a plastic container produced by extrusion-blow-molding, comprising:

inserting a section of a plastic hose, extruded in one or more layers through an extrusion nozzle, into a mold cavity of a blow mold tool; and inflating the plastic hose by a calibrating blow pin according to a shape of the mold cavity, whereby at least one pour opening of the plastic container is determined with respect to its inside diameter and its inside contour to form a completed inflated plastic container, and wherein the calibrating blow pin is axially inserted into the plastic hose section after a head plate of the blow mold tool has been closed, and before the blow mold tool has reached its completely closed position, an axial displacement of the plastic hose being avoided when the calibrating blow pin is axially inserted, and wherein when the blow mold tool is completely closed, the plastic hose is radially squeezed in an area of calibrating surfaces of the calibrating blow pin.

2. Method according to claim 1, wherein:
the blow mold tool includes two blow mold halves, and the calibrating blow pin being inserted axially into the plastic hose section, while the blow mold halves are spaced at a distance from one another, which is 0.5 mm to 10 mm larger than the inside diameter of a pour opening on a neck of the plastic container.

3. Method according to claim 1, wherein the calibrating blow pin is inserted at an axial position that is at an axial distance of 0.3 mm to 5 mm from its end position, before the blow mold tool is completely closed, and is advanced into its axial end position in the plastic hose section after the blow mold tool has been completely closed.

4. Method according to claim 1, wherein the calibrating blow pin is advanced continuously axially during a closing process of the blow mold tool.

5. Method according to claim 4, wherein the calibrating blow pin is advanced axially at a speed of approximately 5 mm/s to approximately 80 mm/s.

6. Method according to claim 5, wherein a double calibrating blow pin, which has two calibration areas for two pour openings, is used.

7. Method according to claim 6, wherein the calibration areas of the double calibrating pin are axially advanced, coupled to one another.

8. Method according to claim 7, wherein the calibration areas of the double calibrating pin are arranged at different axial heights.

9. Method according to claim 6, wherein the calibration areas of the double calibrating pin are configured with outside diameters that are different from one another.

10. Method according to claim 2, wherein the calibrating blow pin is inserted at an axial position that is at an axial distance of 0.3 mm to 5 mm from its end position, before the blow mold tool is completely closed, and is advanced into its axial end position in the plastic hose section after the blow mold tool has been completely closed.

11. Method according to 10, wherein the calibrating blow pin is advanced continuously axially during a closing process of the blow mold tool.

12. Method according to claim 11, wherein the calibrating blow pin is advanced axially at a speed of approximately 5 mm/s to approximately 80 mm/s.

13. Method according to claim 12, wherein a double calibrating blow pin, which has two calibration areas for two pour openings, is used.

14. Method according to claim 13, wherein the calibration areas of the double calibrating pin are axially advanced, coupled to one another.

15. Method according to claim 14, wherein the calibration areas of the double calibrating pin are arranged at different axial heights.

16. Method according to claim 1, wherein excess plastic material is displaced in an axial direction upon radial squeezing of the plastic hose due to completely closing the blow mold tool.

* * * * *